United States Patent [19]
Murase et al.

[11] 3,938,404
[45] Feb. 17, 1976

[54] ENERGY ABSORBING STEERING ASSEMBLY

[75] Inventors: Genyo Murase, Nagoya; Hisahal Mineda; Yozo Yamaguchi, both of Toyota, all of Japan

[73] Assignee: Toyota Jidosha Kogyo Kabushiki Kaisha, Toyota, Japan

[22] Filed: Apr. 17, 1974

[21] Appl. No.: 461,734

Related U.S. Application Data
[62] Division of Ser. No. 256,872, May 25, 1972, Pat. No. 3,822,608.

[30] Foreign Application Priority Data
May 25, 1971 Japan.............................. 46-35819
May 28, 1971 Japan.............................. 46-37156
May 31, 1971 Japan.............................. 46-37678

[52] U.S. Cl. .......................... 74/492; 74/552; 403/2
[51] Int. Cl.² ......................................... B62D 1/10
[58] Field of Search...................... 74/492, 493, 552

[56] References Cited
UNITED STATES PATENTS

| | | |
|---|---|---|
| 2,786,108 | 3/1957 | Sampson.......................... 74/552 X |
| 2,845,810 | 8/1958 | Sampson.............................. 74/493 |
| 3,028,766 | 4/1962 | Musilli.............................. 74/493 X |
| 3,424,473 | 1/1969 | Morgan.............................. 74/493 |
| 3,425,657 | 2/1969 | Doyle...................................... 403/2 |

*Primary Examiner*—Allan D. Herrmann
*Attorney, Agent, or Firm*—Stevens, Davis, Miller & Mosher

[57] ABSTRACT

A steering wheel supporting assembly including first and second hubs secured on the upper end of a steering shaft and on the central portion of the spokes of the steering wheel, respectively, and a shearable connecting means collapsibly connecting the hub members to each other whereby a forward impact energy exerted on the steering column supporting assembly is at least partially absorbed by means of the collapsible connection; the hub members and collapsible connecting means are molded integrally with synthetic resin.

6 Claims, 13 Drawing Figures

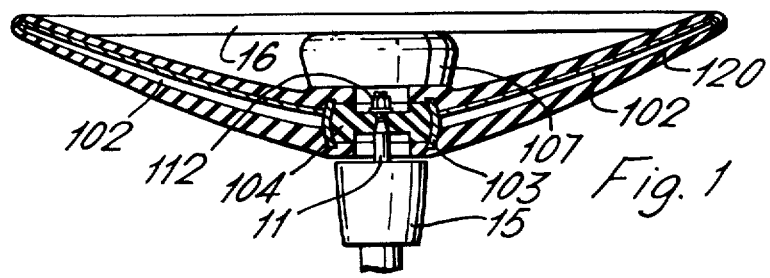
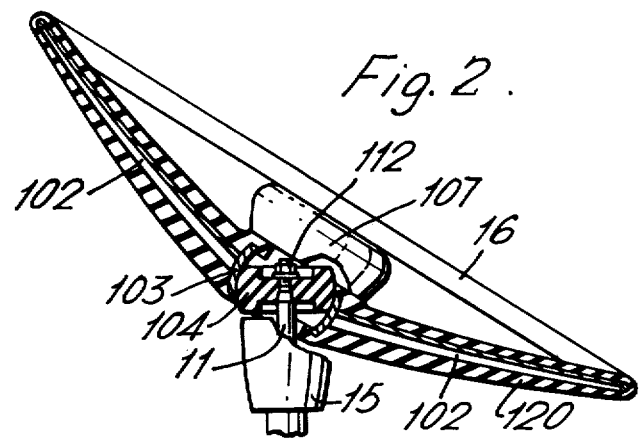
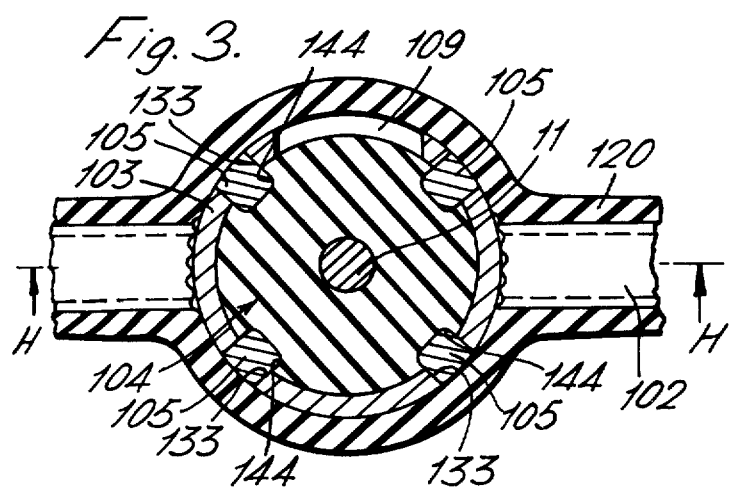

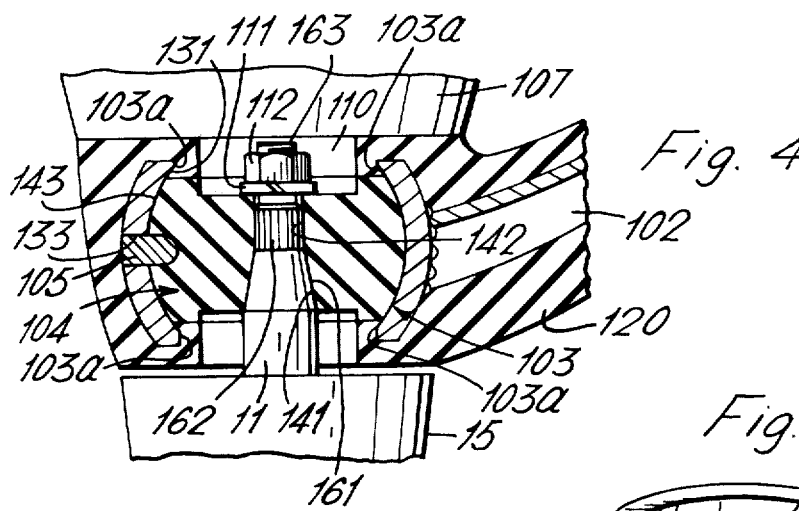
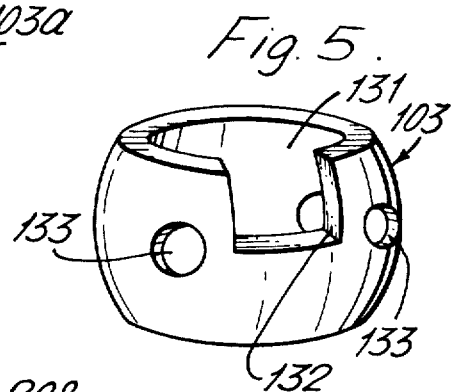
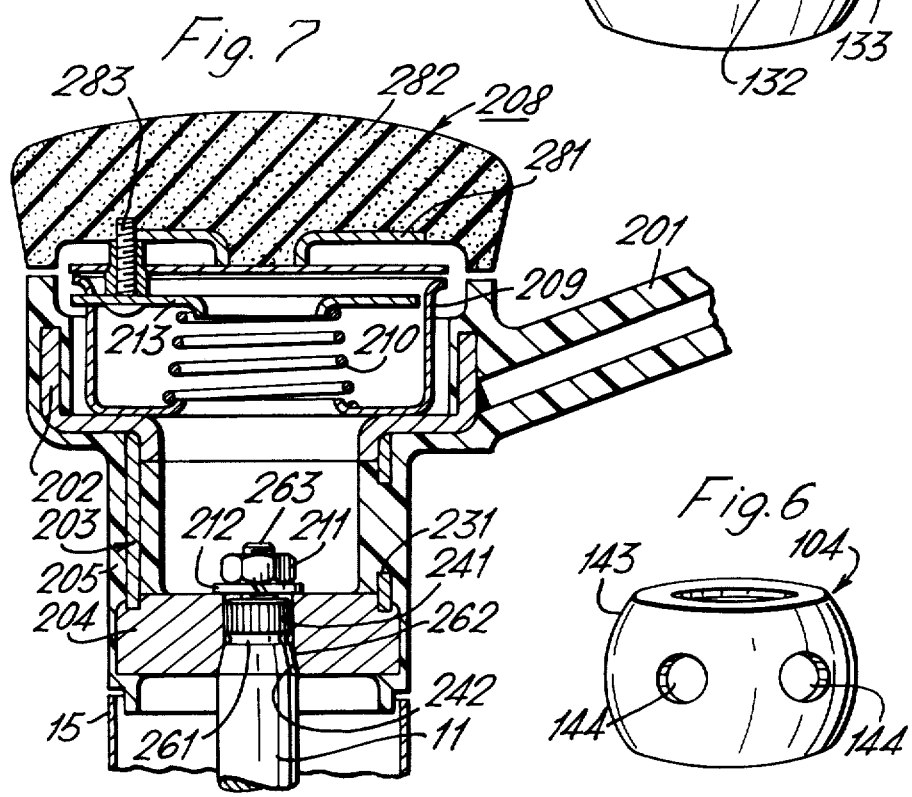
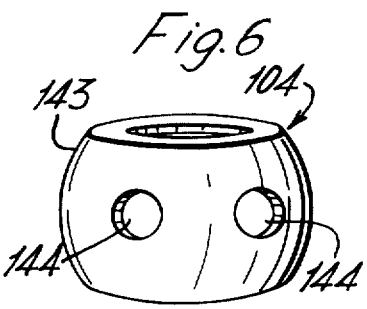

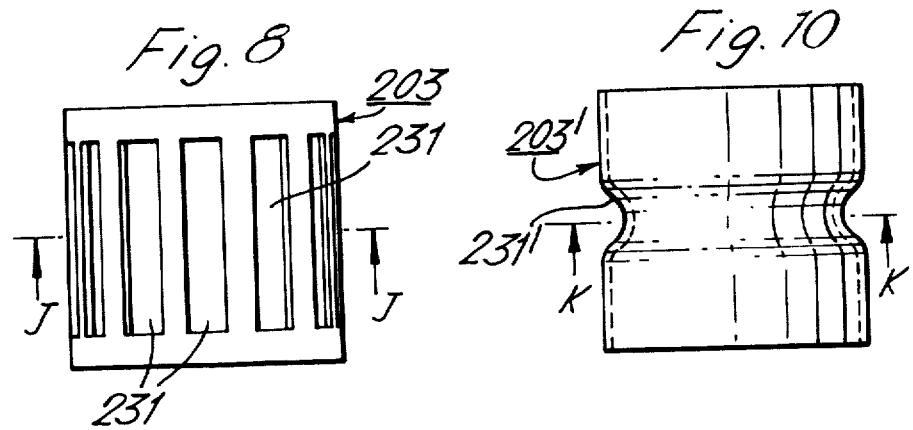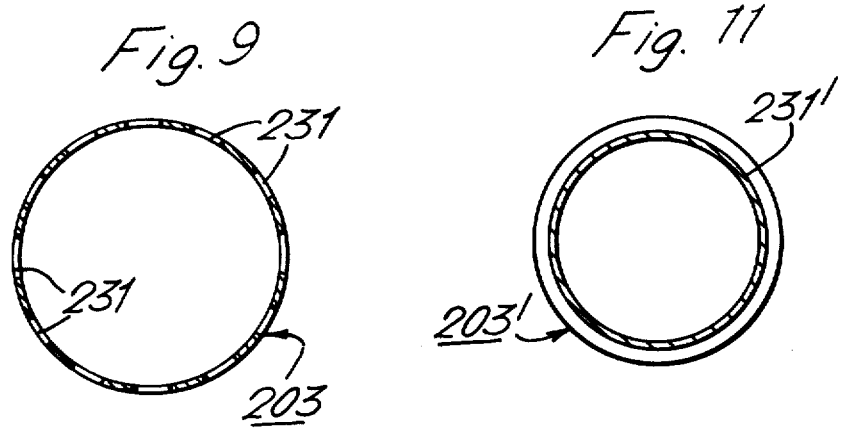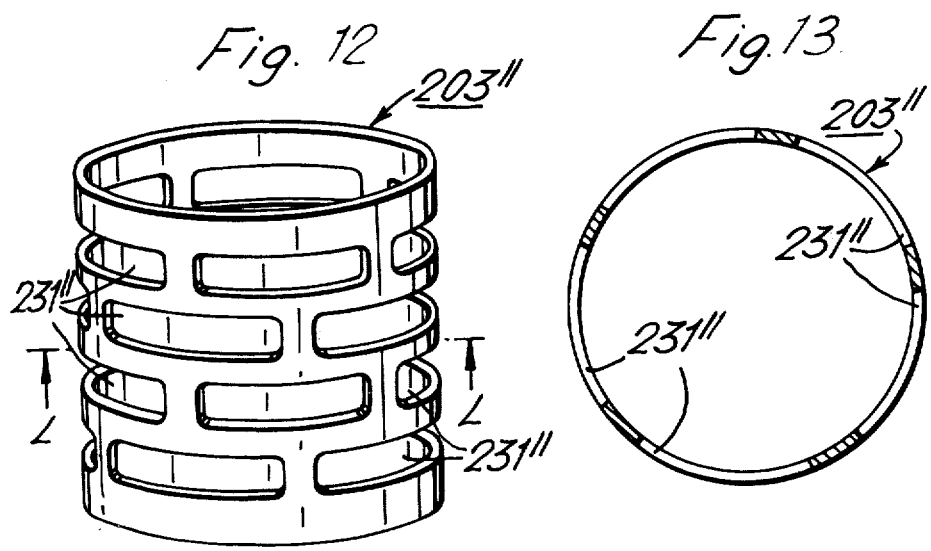

ENERGY ABSORBING STEERING ASSEMBLY

This is a division of application Ser. No. 256,872, filed May 25, 1972, now U.S. Pat. No. 3,822,608, issued July 9, 1974.

BACKGROUND OF THE INVENTION

The present invention relates generally to vehicle steering assemblies and more particularly, to the type of steering column construction that is enabled to absorb forward impact energy by controlled deflection of the steering column components and the steering wheel assembly in occurrence of a vehicle collision.

To protect a motor vehicle driver in occurrence of a collision, there have been introduced various types of safety apparatus for steering assemblies. In the prior art devices, however, the safety feature is rather limited to local deformation of the steering wheel or to an axial deflection of the steering column, which is never enough to expect desired safety effects for the drivers, particularly, for certain types of vehicles. This has particularly been true for the drivers of tracks of cab-over type and buses the steering shafts of which are rather vertically provided to have the steering wheels positioned angularly toward the driver's bodies. Thus, the sharp angle of the impact load given to the drivers has resulted in serious damages against the drivers.

It should well be considered to be very ideal for the mentioned certain types of vehicles, if the drivers are protected by total impact energy absorbing operation obtained through enough deflective displacements of the steering column as well as the steering wheel.

BRIEF SUMMARY OF THE INVENTION

It is, therefore, a prime object of the present invention to provide a safety apparatus most properly designed for a steering column assembly which includes a steering shaft connected vertically with the vehicle steering gear by way of a flexible coupling to be forwardly deflective and a column tube having the steering shaft journalled rotatably therein.

It is a further object to provide a safety apparatus, having the above mentioned characteristics, wherein a steering wheel supporting assembly is enabled to deflect to absorb further the forward impact energy in addition to the functions of the steering column supporting assembly.

It is still another object of the present invention to provide a safety apparatus, having the above mentioned characteristics, in which the safety apparatus can be manufactured compactly with a low production cost and be installed in the vehicle with simple assembling, the apparatus yet being durable and ensuring accurate operation thereof.

The apparatus to be described in detail below may be used with energy absorbing steering column assemblies of the type disclosed and claimed in U.S. Pat. No. 3,822,608, issued July 9, 1974, on application Ser. No. 256,872, filed May 25, 1972; in Ser. No. 461,651, filed Apr. 17, 1974; in Ser. No. 461,560, filed Apr. 17, 1974; and/or in Ser. No. 461,649, filed Apr. 17, 1974. The entire and complete disclosures of each of the aforementioned patent and patent applications are incorporated herein by reference thereto.

BRIEF DESCRIPTION OF THE DRAWINGS

The above and other objects, features and advantages of the present invention will become more readily apparent from the following description of the preferred embodiments with reference to the accompanying drawings forming a part of the specification.

In the drawings:

FIG. 1 shows an elevational section of a steering wheel device characterized with another feature of the present invention.

FIG. 2 shows the steering wheel device shown in FIG. 1 when deflectively displaced.

FIG. 3 shows a partially enlarged sectional-plane view of the steering wheel device in FIG. 1.

FIG. 4 is an enlarged elevational sectional view taken along H—H line in FIG. 3.

FIG. 5 is a perspective view of a supporting member to support spokes shown in FIGS. 1-4, inclusive.

FIG. 6 is a perspective view of a hub fixed on the steering shaft shown in FIGS. 1-4, inclusive.

FIG. 7 shows an elevational sectional view of a modification of the steering wheel device shown FIG. 1.

FIG. 8 is a front view of an energy absorbing member which is an important construction member of the device shown in FIG. 7.

FIG. 9 is a cross-sectional view taken along J—J line in FIG. 8.

FIG. 10 shows a front view of a modification of the energy absorbing member in FIG. 8.

FIG. 11 shows a cross-sectional view taken along K—K line in FIG. 10.

FIG. 12 shows a front view of another modification of the energy absorbing member in FIG. 8.

FIG. 13 is a cross-sectional view taken along L—L line in FIG. 12.

DESCRIPTION OF THE PREFERRED EMBODIMENTS

The safety features of the present invention are characterized with the following construction of a steering wheel device. Reference is now made to FIGS. 1-6, inclusive, wherein disclosed is the steering wheel 16 which includes two spokes 102, 102 having a U-shaped cross section. The spokes 102, 102 extend integrally along the radius of the steering wheel 16 and the base ends of the spokes 102, 102 are welded on the periphery of a supporting member 103. The supporting member 103 is a ring member with an arcuate cross section and as well shown in FIGS. 4 and 5, a concave spheric wall 131 is formed on the inner circumference of the supporting member 103. A recess 132 is cut off from the upper portion of the supporting member 103. A hub 104 has a taper hole 141 and a serration 142 drilled at the center portion thereof and a tapered portion 161 and a serration 162 at the top of the steering shaft 11 are engaged with the taper hole 141 and the serration 142. A threaded porton 163 bossed from the steering shaft 11 into a cavity 110 of the hub 104 is fastened by a lock nut 112 through a spring washer 111 so that the hub 104 is firmly secured on the top end of the steering shaft 11 and never allowed to rotate. THe periphery of the hub 104 is designed to have a convex spheric wall 143 which corresponds with the concaved spheric wall 131 of the supporting member 103. The supporting member 103 is coupled with the hub 104 to be rotatable by way of the corresponding spheric walls 131 and 143. A plurality of through holes 133 are radially drilled on the supporting member 103 (in this embodiment four through holes) and correspondingly a plurality of holes 144 are also provided on the spheric periphery 143 of the hub 104. The supporting member 103 and the hub 104 are integrally secured by shearable pins 105 inserted into the holes 133 and 144. The shearable pins 105 are made of synthetic resin or metal. The supporting member 103 and the hub 104 are molded correspondingly with the synthetic resin 120 covering the steering wheel 16 and the spokes 102, 102. And the supporting member 103 is further prohibited to rotate against the hub 104 by way of the synthetic resin 120 molded around the shoulders 103a thereof. The recess 132 of the supporting member 103 is for easy coupling of the hub 104 into the supporting member 103 and, upon completion of the assembling work of the hub 104 to the supporting member 103, is mounted with a filling member 109 and covered up with the synthetic resin 120 integrally molded. Indicated with a reference numeral 107 is a horn button positioned at the center of the steering wheel 16.

In occurrence of a vehicle collision, a forward impact load from the driver is exerted to the steering wheel 16 at a limited portion. When this impact load exceeds a predetermined value, the shearable pins 105 are sheared off to disconnect the supporting member 103 from the hub 104. The synthetic resin 120 around the supporting member 103 is broken and the supporting member 103 makes frictional rotation along the spheric periphery 143 of the hub 104 in response to the direction of the load force. This deflects the steering wheel 16 as shown in FIG. 2. The supporting member 103 never comes off from the hub 104 in the shock absorbing rotation. It is now clear that in the vehicle collision, the load collectively given to a limited portion of the steering wheel 16 is turned to be received by the whole steering wheel 16 to soften the impact force given to the driver.

The impact load absorbing operation can well be controlled by the proper selections of a nature and a shape of the shearable pins 105 and connecting force between the supporting member 103 with the synthetic resin 120.

Another embodiment is disclosed in FIGS. 7–13, inclusive, wherein there is shown a spoke 201 radially extending from a steering wheel (not shown). The base end of the spoke 201 is welded on the annular periphery of an upper hub member 202. An annular lower hub member 204 secured on the steering shaft 11 is connected with the upper hub member 202 by way of a cylindrical energy absorbing member 203 the top end of which is welded on the neck of the upper hub member 202. The spoke 201, the upper hub member 202, the energy absorbing member 203 and the lower hub member 204 are molded all over with synthetic resin 205 to form the whole steering wheel.

The energy absorbing member 203 is formed in a cylindrical shape out of sheet metal with a selected thickness, as well illustrated in FIG. 8. A plurality of oblong cut-out holes 231 are provided axially on the periphery of the energy absorbing member 203. The strength of the energy absorbing member 203 can well be adjusted by proper selections of the size, shape, and number of the holes 231 and/or a thickness of sheet metal. When molded integrally with the synthetic resin 205, the energy absorbing member 203 has its holes 231 filled with the synthetic resin 205. Serration 241 and a taper hole 242 are provided respectively at the upper center portion and at the lower center portion of the lower hub member 204. Serration 261 and a tapered portion 262 provided at the top end of the steering shaft 11 are engaged with the serration 241 and the taper hole 242 which are firmly secured on the steering shaft 11 by a nut 211 threaded through a spring washer 212 onto a threaded portion 263 jutting up into a cavity formed within the energy absorbing member 203. A horn button 208 is made of elastic synthetic resin, for instance, uretan rubber, integrally with a base plate 281 and assembled by a screw 283 through a coil spring 210 and a ring 213 on a holding member 209 of a cup shape secured on a shoulder of the inner circumference of the upper hub member 202.

Upon occurrence of a vehicle collision, a forward impact load from the driver is exerted on the steering wheel 16 at a limited portion. The transmitted load compresses and deforms the energy absorbing member 203 and consequently, the synthetic resin 205 is broken. Thus, the steering wheel 16 is turned in response with the load operating direction. Therefore, although a portion of the driver's body is impactly struck to a limited portion of the wheel, the impact load is received by the whole wheel 16 so as to protect the driver.

In the above embodiments, the strength of the energy absorbing member 203 is to be adjusted by the shape, size and number of the holes 231. The adjustment can be made as well by changes of the shape of an indent 231' provided on a cylindrical energy absorbing member 203', shown in FIG. 10, to replace the energy absorbing member 203. The energy absorbing member 203 can also be replaced with another 203'', shown in FIGS. 12 and 13, which has a plurality of oblong holes 231'' cut off therefrom, the oblong holes 231'' being horizontally positioned zig-zag to each other. The strength adjustment of the energy absorbing member 203'' can be made by good selections of the shape, size and number of the holes 231'' and/or a thickness of the energy absorbing member 203'' itself. With the steering wheel 16 adopting the energy absorbing member 203'', the forward impact load exerted thereto from any direction can well be absorbed and softened by buckling deformation of the energy absorbing member 203''.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:
1. A steering wheel mounting apparatus comprising:
   a hub member securely mounted on the top end of a steering shaft of a vehicle and provided with a convex spherical periphery;
   a supporting member connected to the spokes of a steering wheel and provided with a concave spherical inner circumference corresponding with said convex periphery of said hub member; and
   radially extending connecting means for shearably connecting said hub member and said supporting member coupled to each other.

2. A steering wheel mounting apparatus as claimed in claim 1, wherein said hub member, said supporting member and said connecting means are integrally molded with synthetic resin covering said steering wheel and said spokes.

3. A steering wheel mounting apparatus as claimed in claim 1, wherein said connecting means comprises a plurality of shearable pins for radially connecting said hub member with said supporting member.

4. A steering wheel mounting apparatus as claimed in claim 3, further comprising: a first plurality of holes formed in said hub member; and a second plurality of holes formed through said supporting member and corresponding to said first plurality of holes; said shearable pins extending through said second and into said first plurality of holes to secure said hub and supporting members to each other.

5. A steering wheel mounting apparatus, comprising: a hub member fixed to a steering shaft of a vehicle and having a concave part-spherically exterior surface; a support member fixed to a steering wheel of the vehicle and having a part-spherically shaped interior surface complementary to said concave surface of said hub member, said support member interior surface extending over said hub member to contain said hub member within said support member and to inhibit substantial relative longitudinal movement of said hub and support members; and radially extending connecting means for shearably connecting said hub and supporting members to each other.

6. A steering wheel mounting apparatus as claimed in claim 5, further comprising: a first plurality of holes radially formed in said hub member; and a second plurality of holes formed through said supporting member and corresponding to said first plurality of holes; wherein said connecting means comprises a plurality of shearable pins extending radially through said second and into said first plurality of holes to secure said hub and supporting members to each other.

* * * * *